(12) United States Patent
Yoshida

(10) Patent No.: US 9,354,433 B2
(45) Date of Patent: May 31, 2016

(54) IMAGE MEASURING APPARATUS

(75) Inventor: Hiroyuki Yoshida, Kure (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 1019 days.

(21) Appl. No.: 13/398,042

(22) Filed: Feb. 16, 2012

(65) Prior Publication Data

US 2012/0212607 A1 Aug. 23, 2012

(30) Foreign Application Priority Data

Feb. 17, 2011 (JP) ................................ 2011-031483

(51) Int. Cl.
*H04N 5/232* (2006.01)
*H04N 7/18* (2006.01)
*G02B 21/00* (2006.01)
*G01B 11/24* (2006.01)
*G02B 21/36* (2006.01)
*G03B 3/10* (2006.01)
*G03B 13/36* (2006.01)
*G03B 15/02* (2006.01)

(52) U.S. Cl.
CPC ............ *G02B 21/0016* (2013.01); *G01B 11/24* (2013.01); *G02B 21/365* (2013.01); *G03B 3/10* (2013.01); *G03B 13/36* (2013.01); *G03B 15/02* (2013.01); *H04N 5/23212* (2013.01)

(58) Field of Classification Search
CPC .......... H04N 7/12; G03B 13/00; G03B 13/34; H01J 37/28
See application file for complete search history.

(56) References Cited

U.S. PATENT DOCUMENTS

| 2006/0198624 A1* | 9/2006 | Ono et al. ...................... 396/133 |
| 2008/0116376 A1 | 5/2008 | Takane et al. |
| 2009/0073305 A1* | 3/2009 | Yuba et al. .................... 348/345 |
| 2010/0128137 A1 | 5/2010 | Guidash |
| 2011/0267520 A1 | 11/2011 | Pyanet et al. |

FOREIGN PATENT DOCUMENTS

| CN | 1573283 | 2/2005 |
| FR | 2 940 841 | 7/2010 |
| FR | 2940841 | 7/2010 |

(Continued)

OTHER PUBLICATIONS

Japanese Office Action with English Translation dated Sep. 2, 2014, 5 pages.

(Continued)

*Primary Examiner* — Sath V Perungavoor
*Assistant Examiner* — Patricia I Young
(74) *Attorney, Agent, or Firm* — Rankin, Hill & Clark LLP

(57) ABSTRACT

An image measuring apparatus includes: an imaging device of a rolling shutter type configured to image a work; a position control system configured to output a focusing position as information representing a position in a direction of a focusing axis by controlling an in-focus position of the imaging device; and a computing device configured to calculate, from image information acquired from the imaging device, contrast information corresponding to the image information, wherein the computing device divides an acquired image into a plurality of regions and corrects the contrast information corresponding to the image information based on a position of and the contrast information corresponding to each of the regions.

2 Claims, 8 Drawing Sheets

(56) References Cited

FOREIGN PATENT DOCUMENTS

| | | |
|---|---|---|
| JP | 2007-010908 | 1/2007 |
| JP | 2007-036775 | 2/2007 |
| JP | 2009-168607 | 7/2009 |
| JP | 2010-072045 | 4/2010 |
| JP | 2010-107724 | 5/2010 |
| JP | 2011-047883 | 3/2011 |

OTHER PUBLICATIONS

Chinese Office Action dated Sep. 26, 2014, Application No. 2012100380088; English translation included, 11 pages.

* cited by examiner

IMAGE MEASURING APPARATUS

BACKGROUND

1. Field of the Invention

The present invention relates to an image measuring apparatus for measuring a measuring object by imaging the measuring object.

2. Description of the Related Art

In an image measuring apparatus having an autofocusing function, images of a measuring object are sequentially acquired while an imaging device such as a camera or an optical system of the imaging device is moved in the direction of the optical axis thereof. Then, an in-focus position in the direction of the optical axis of the imaging device is calculated from the contrast of each of the images (see JP-A-2009-168607).

Hitherto, generally, an imaging device of the global shutter type has been mounted on such an image measuring apparatus. The imaging device of the global shutter type is suited to the above contrast type autofocusing, because exposure is performed simultaneously at all light receiving elements thereof.

On the other hand, an imaging device of the rolling shutter type has been known as that of the type differing from that of the global shutter type. The imaging device of the rolling shutter type is low in price, as compared with that of the global shutter type. However, when utilized for the above contrast type autofocusing, the imaging device of the rolling shutter type has the following problems.

That is, the imaging device of the rolling shutter type performs imaging sequentially on each column or pixel of light receiving elements configured by being arranged like an array. Accordingly, when imaging is performed while the imaging device of the rolling shutter type is moved in the direction of the optical axis, the position of the imaging device varies with that of the pixel at which an image is acquired.

When the position of the imaging device at the center of the light receiving timings of the light receiving elements is employed as a reference position, information on the position of the imaging device is acquired as that representing an imaging position, simultaneously with the reception of light by a centrally positioned one of the light receiving elements arranged like an array. Thus, a part, on which imaging is performed just after the start of the imaging, is imaged before the imaging at the reference position. Similarly, a part, on which imaging is performed just before the end of the imaging, is imaged after the reference position. Accordingly, if a part at which the contrast changes most in an imaging range is located apart from the center position of the imaging range, an error is caused between the in-focus position determined based on the contrast calculated from the acquired image and the acquired imaging position.

SUMMARY

The invention is accomplished in view of such a respect. An object of the invention is to inexpensively provide an image measuring apparatus capable of performing high-precision autofocusing.

According to a first aspect of the invention, there is provided an image measuring apparatus includes an imaging device of the rolling shutter type configured to image a work, a position control system configured to output a focusing position as information representing a position in the direction of a focusing axis by controlling an in-focus position of the imaging device, and a computing device configured to calculate, from image information acquired from the imaging device, contrast information corresponding to the image information. The computing device divides an acquired image into multiple regions and corrects the contrast information corresponding to the image information based on a position of and the contrast information corresponding to each of the regions.

According to a second aspect of the invention, the computing device corrects contrast information of each region from contrast information and imaging timing corresponding to each of prior image information and subsequent image information respectively representing a prior image and a subsequent image thereof, which are consecutively imaged.

According to a third aspect of the invention, the computing device calculates contrast information concerning each of regions respectively corresponding to the prior image information and the subsequent image information, multiplies the contrast information by a weight corresponding to imaging timing thereof, and sums results of the multiplication.

According to the invention, an image measuring apparatus capable of performing high-precision autofocusing can inexpensively be provided.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

First Embodiment

Next, the configuration of an image measuring apparatus according to the first embodiment of the invention is described hereinafter in detail with reference to the drawings.

Figure 1:
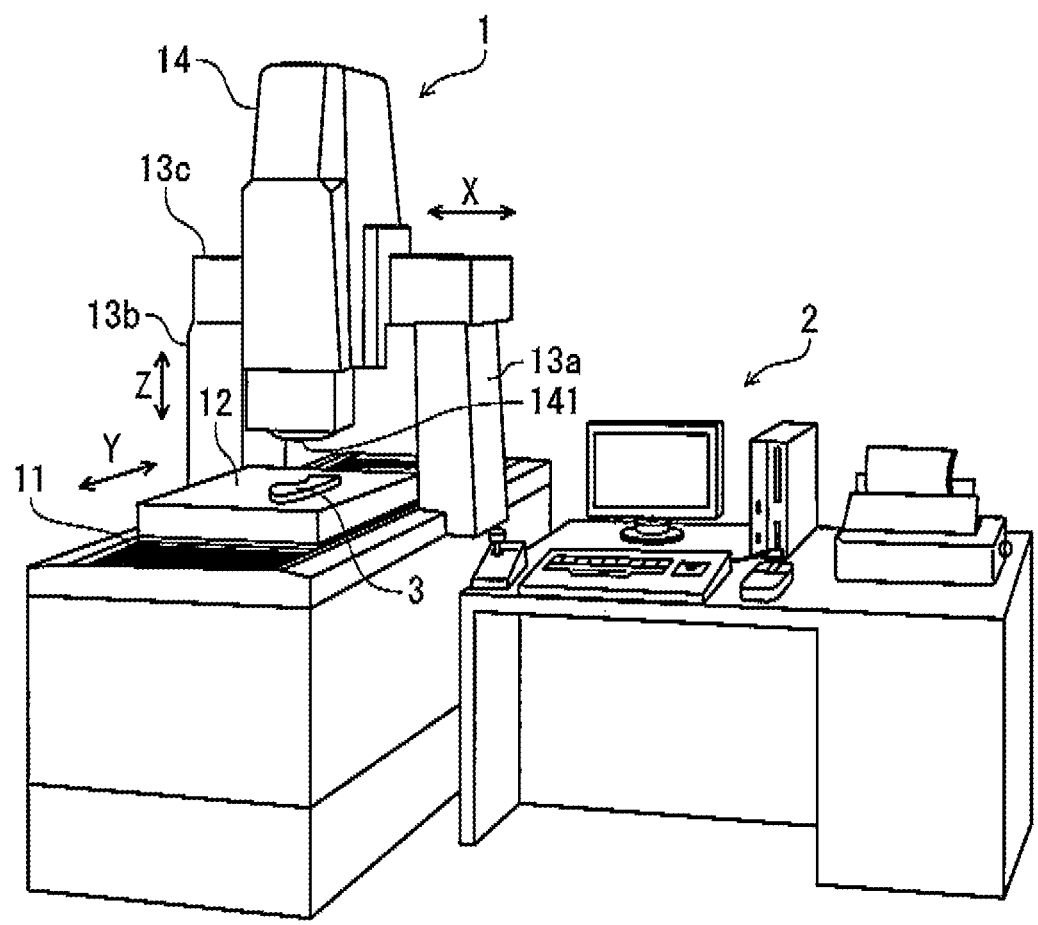
FIG. 1 is an overall diagram illustrating an image measuring apparatus according to a first embodiment of the invention.

FIG. 1 is an overall diagram illustrating an image measuring apparatus according to the present embodiment. The image measuring apparatus includes an image measuring instrument 1 on which a camera 141 is mounted as an imaging device for imaging a work 3, and a computer (hereinafter referred to as a "PC") 2 electrically connected to the image measuring instrument 1.

The image measuring instrument 1 is configured as follows. That is, a specimen table 12 is placed on a specimen moving means 11 such that the top surface of the specimen table 12 coincides with a horizontal plane as a base surface. An X-axis guide 13c is supported at the top end of each of arm support members 13a and 13b erected on both side ends of the specimen moving means 11. The specimen table 12 is driven in Y-axis direction by the specimen moving means 11. On the X-axis guide 13c, an imaging unit 19 is moveably supported in X-axis direction. A complementary metal-oxide semiconductor (CMOS) camera 141 of the rolling shutter type is attached to the bottom of the imaging unit 14.

Incidentally, the present embodiment has a configuration in which the work 3 placed on the specimen table 12 is imaged. Apparently, an embodiment of the invention can have another configuration, e.g., a configuration in which a work placed on a floor is sideways imaged.

Figure 2:
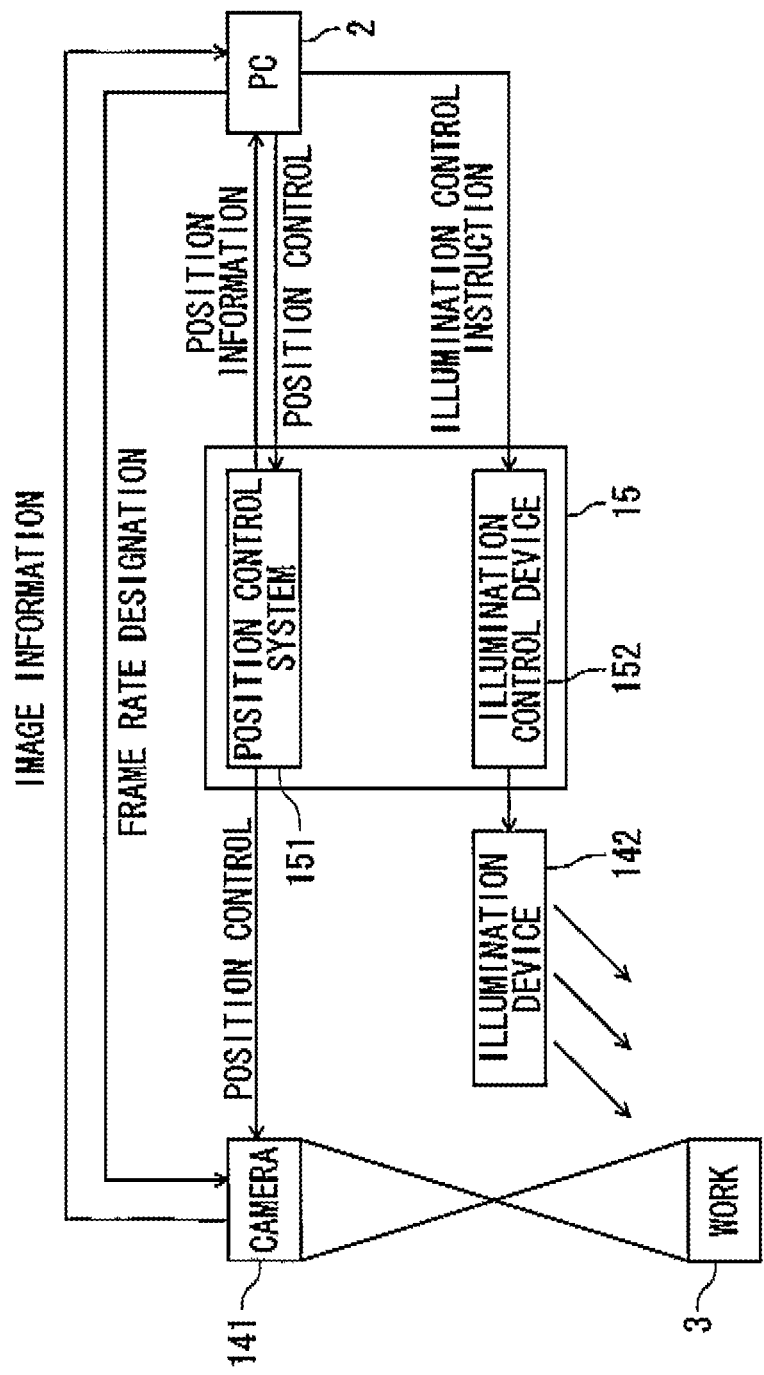
FIG. 2 is a block diagram illustrating the configuration of the image measuring apparatus.

FIG. 2 is a block diagram illustrating the configuration of the image measuring apparatus according to the present embodiment. According to the present embodiment, the image measuring apparatus includes, e.g., a controller 15 provided in the image measuring instrument 1. The controller 15 includes a position control system 151 and an illumination control device 152. The imaging unit 14 includes an illumination device 142 for irradiating light onto the work 3. The PC 2 controls a focal position of the camera 141 via the position control system 151. In addition, the PC 2 sends a signal designating a frame rate to the camera 141, and a signal designating an amount of light of the illumination device 142 to the illumination device 142, respectively. The camera 141 images the work 3 irradiated with light from the illumination device 142, at a designated frame rate. Then, the camera 141 sends image information to the PC 2. At that time, position information representing the position of the camera 141 is sent from the position control system 151. Incidentally, various types of illumination equipment can be used as the illumination device 142. For example, a pulse width modulation (PWM) controlled light emitting diode (LED) can also be used as the illumination device 142.

Figure 3:
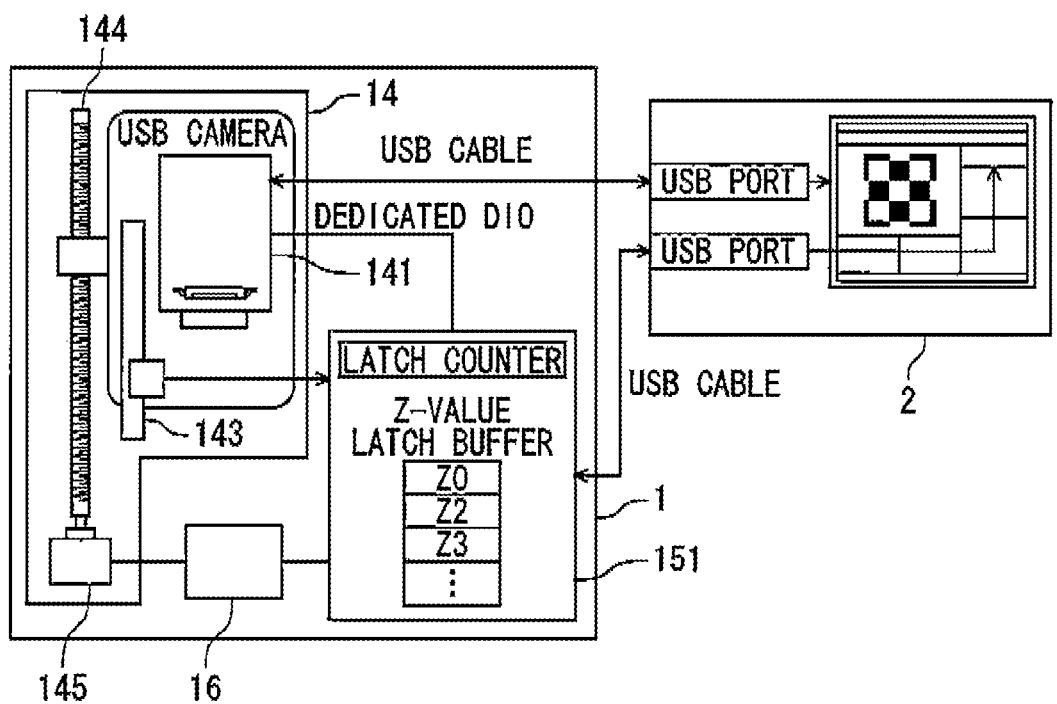
FIG. 3 is a block diagram illustrating the configuration of a part of the image measuring apparatus.

Next, the configuration of the imaging unit 14 in the image measuring apparatus according to the present embodiment is described hereinafter. FIG. 3 is a block diagram illustrating the configuration of a part of the image measuring apparatus according to the present embodiment. In the present embodiment, the imaging unit 14 includes the camera 141, a linear encoder 143 for detecting and outputting the Z-coordinate of the camera 141, a camera drive mechanism 144 for driving the camera 141 in the direction of Z-axis, and a Z-axis motor 145 for driving the camera drive mechanism 144. The Z-axis motor 145 is controlled by the position control system 151 via a power unit 16 provided in the image measuring instrument 1. The linear encoder 143 is attached to the imaging unit 14 such that a scale or a detection head moves in the direction of the Z-axis interlockingly with the camera 141. The position control system 151 includes a latch counter and a Z-value latch buffer. The position control system 151 acquires, from the linear encoder 143, Z-coordinate information representing the Z-coordinate of the camera 141 in the response to a trigger signal, and retains the acquired Z-coordinate information in the Z-value latch buffer. The camera 141 is connected to the PC 2 via a universal serial bus (USB) cable, and to the position control system 151 via a dedicated digital input/output (DIO).

The position control system 151 outputs a Z-axis drive instruction to the power unit 16. The power unit 16 supplies electric drive power to the Z-axis motor 145. The Z-axis motor 145 drives the camera 141 by the camera drive mechanism 144. The camera 141 performs imaging at an optional frame rate, and sends image information to the PC 2 via the OSB cable. At that time, the image measuring apparatus can be adapted such that a vertical synchronization signal, is output from the camera 141 to the position control system 151 as a trigger signal. In this case, the position control system 151 receives a vertical synchronization signal, and acquires a Z-coordinate of the camera 141 from the encoder 143 in response to the received signal. The acquired Z-value is retained in the Z-value latch buffer. In addition, the latch counter is updated. The retained Z-value is transmitted to the PC 2 in response to a read instruction. Although the camera 141 is driven in the direction of the Z-axis in the present embodiment, a similar operation can be performed by adjusting an optical system, such as a lens, provided in the camera 141. In addition, although a USB interface is used as a digital serial communication means in the present embodiment, apparently, other means such as a gigabit-Ethernet (Gig-E) interface, and a FireWire (registered trademark) interface can be used as the digital serial communication means. Alternatively, analog communication means (providing NTSC output, or composite output) can be used, instead of the digital serial communication means. In the case of using the analog communication means, the PC 2 acquires an image via a frame grabber.

Figure 4:
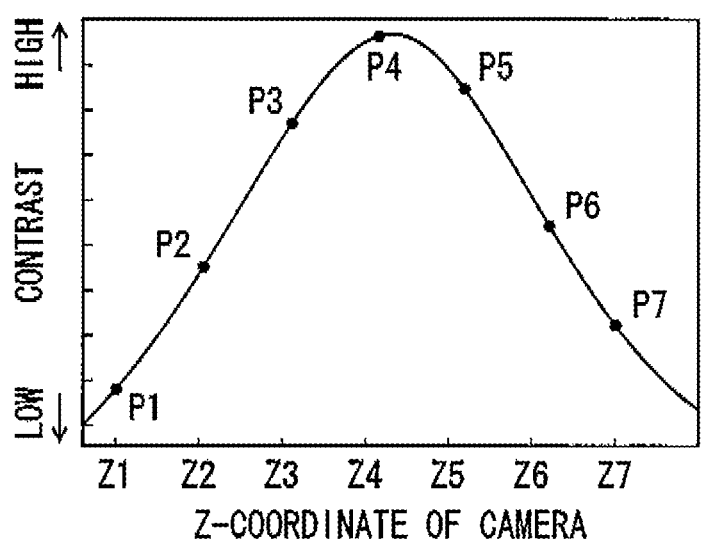
FIG. 4 is a graph illustrating an autofocusing method performed in the image measuring apparatus.

Next, an autofocusing method performed in the image measuring apparatus according to the present embodiment is described hereinafter. FIG. 4 is a graph illustrating an autofocusing method performed in the image measuring apparatus according to the present embodiment. The axis of abscissas represents the Z-coordinate of the camera 141, and the axis of ordinates represents contrast.

During autofocusing in the image measuring apparatus according to the present embodiment, imaging is performed at plural Z-coordinates. Then, contrast is calculated from an image obtained at each coordinate position. In addition, a contrast curve represented by a solid line shown in FIG. 4 is obtained, based on the plural calculated contrast-values. Then, a peak position of the contrast curve is determined as an in-focus position. In the case of the example illustrated in FIG. 4, imaging is performed at the Z-coordinates (Z1 to Z7) of seven positions. In addition, the contrast-values (P1 to P7) respectively corresponding to the Z-coordinates are calculated.

Figure 5:
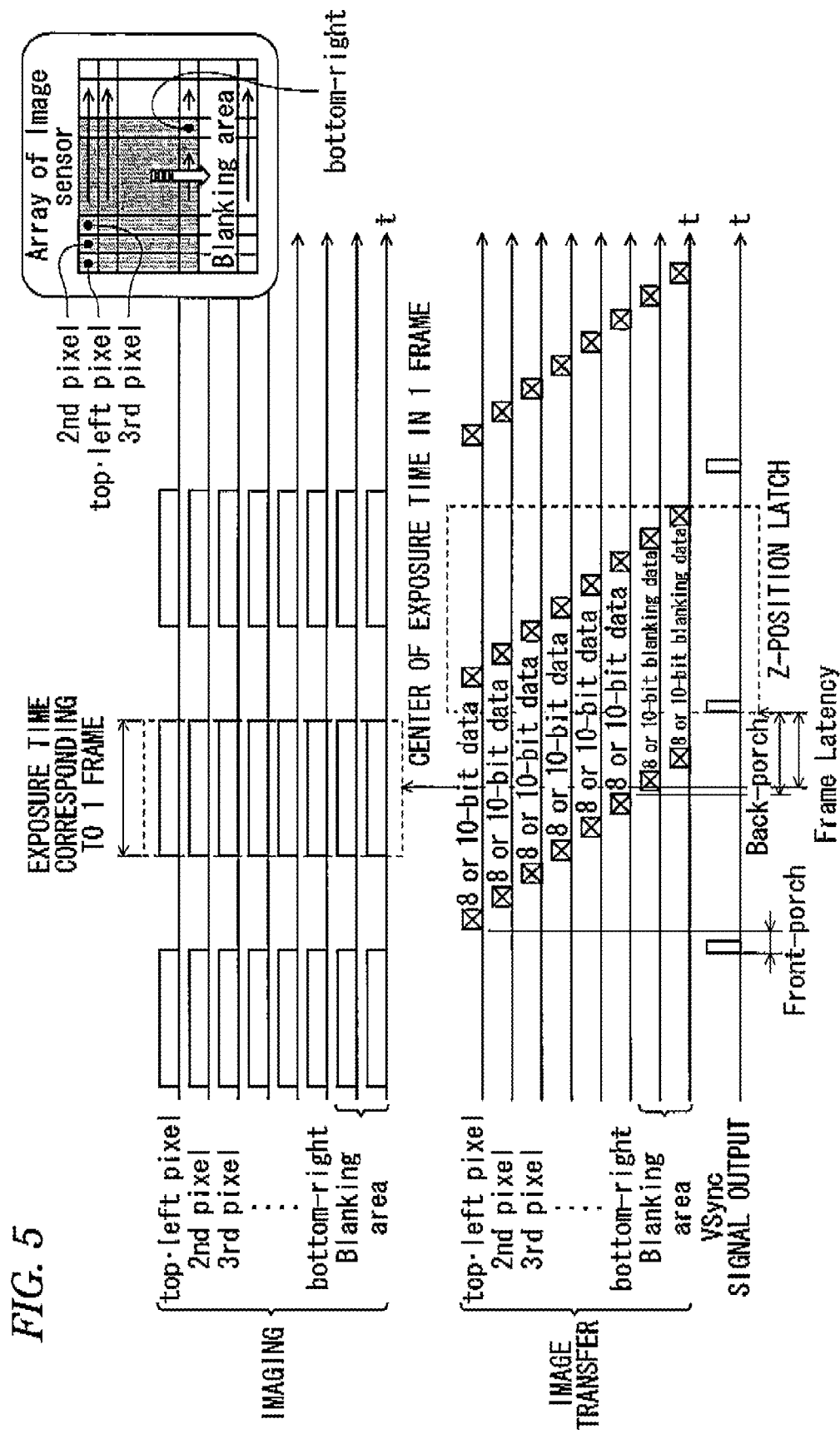
FIG. 5 is a timing chart illustrating imaging timing in an imaging device of the global shutter type.

Hitherto, when an image is acquired during autofocusing of such a contrast type, a charge-coupled device (CCD) camera of the global shutter type has been used. FIG. 5 is a timing chart illustrating imaging timing in an imaging device of the global shutter type.

An upper part of FIG. 5 illustrates exposure timing of an imaging element of the COD camera, while a lower part of FIG. 5 illustrates timing of outputting each of image information and a vertical synchronization signal. As illustrated in FIG. 5, all imaging elements are simultaneously exposed in the CCD camera of the global shutter type. Then, images are sequentially transferred.

Figure 6:
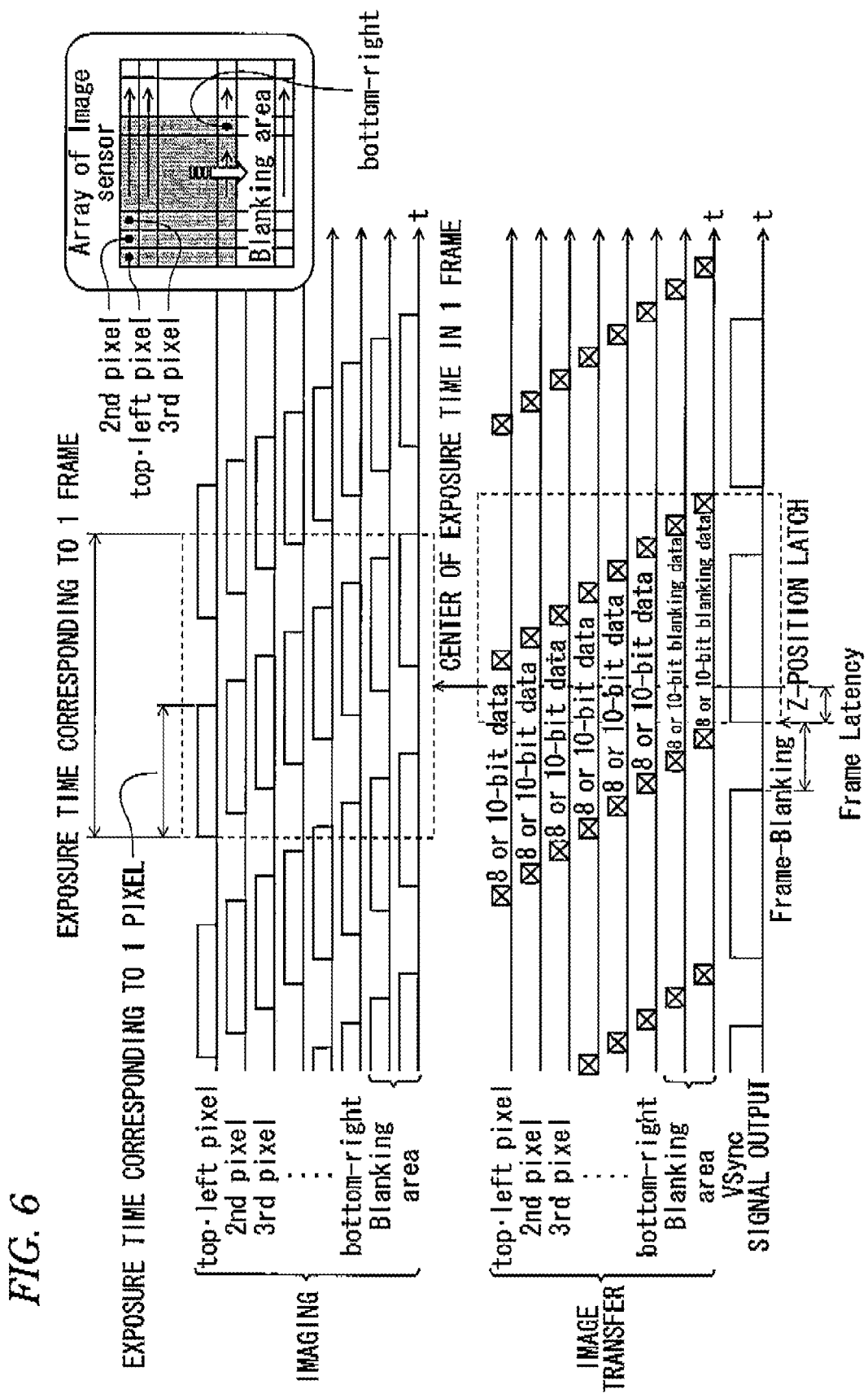
FIG. 6 is a timing chart illustrating an example of imaging timing in an imaging device of the rolling shutter type.

On the other hand, the pixel columns of a CMOS camera of the rolling shutter type differ from one another in imaging-timing. FIG. 6 is a timing chart illustrating an example of the imaging timing in the CMOS camera of the rolling shutter type.

Similarly to FIG. 5, an upper part of FIG. 6 illustrates exposure timing of the CMOS camera, while a lower part of FIG. 6 illustrates timing of each of outputting image information and a vertical synchronization signal. For convenience of description, it is now assumed that the number of pixels of the CMOS camera is xxy, that the coordinate of a top-left pixel is (1, 1), and that the coordinate of a bottom-right pixel is (x, y).

When imaging is started in the CMOS camera of the rolling shutter type, light receiving elements arranged like pixels (1,1), (2,1), (3,1), . . . on a first line are sequentially exposed. Then, light receiving elements arranged on each of second and later lines are similarly exposed sequentially from the second line. Image information corresponding to each pixel, which is obtained by the imaging element, is output from each pixel, simultaneously with the end of receiving light at each pixel.

During an autofocusing operation, the camera 141 is moved by simultaneously imaging the work 3. The position in the direction of the Z-axis of the camera 141 at the start of imaging of 1 frame at that time is assumed to be Z1. An intermediate position in the direction of the Z-axis of the camera 141 is assumed to be Z2. The position in the direction of the Z-axis of the camera 141 at the end of imaging of 1 frame is assumed to be Z3. In this case, the position of the camera 141 at the time of imaging the pixel (1, 1) is Z1. The position of the camera 141 at the time of imaging the pixel at the central position of an imaging range is Z2. The position of the camera 141 at the time of imaging the pixel (x, y) is Z3.

If the position (hereinafter referred to as a "reference position") in the direction of the Z-axis of the camera 141, which is latched by the position control system 151, is assumed to be Z2, Z2 is retained in the Z-value latch buffer. Then, Z2 is transferred to the PC 2. Thus, the PC 2 recognizes that all image data of the pixels from (0, 0) to (x, y) are imaged while the position of the camera 141 is Z2. Accordingly, an error is caused between the position of the camera 141 at the time of actually imaging each of the pixels and that of the camera 141 at that time, which is recognized by the PC 2. In this case, the error at the time of imaging the pixel (1, 1) is Z2−Z1. The error at the time of imaging the pixel (x, y) is Z3−Z2. Both of the errors are maximum values.

Figure 7A:
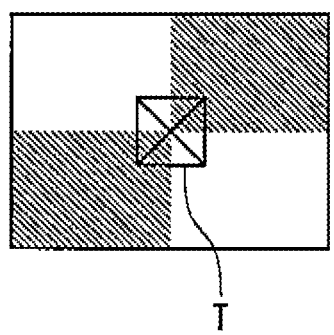
FIGS. 7A to 7C are diagrams each illustrating an example of an image imaged by the imaging apparatus during an autofocusing operation.
Figure 7B:
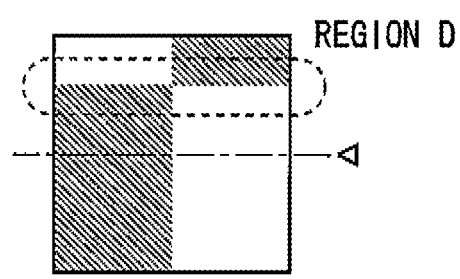
Figure 7C:
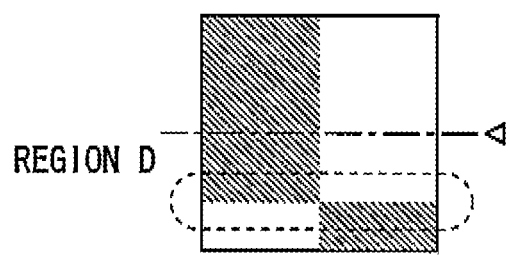

FIGS. 7A to 7C each illustrate an example of an image imaged by the camera 141 during an autofocusing operation. FIG. 7A illustrates a whole image of the imaging range. FIGS. 7B and 7C each is an enlarged view of an image inside a tool T illustrated in FIG. 7A, which determines an image range used for autofocusing. It is now assumed that there is a region B, at which contrast changes most significantly, in the tool T, and that the position of the camera 141 at the time of imaging a region D is Zd.

The PC 2 calculates a contrast value C from a transferred image inside of the tool T. It is known that generally, the contrast value C is obtained by the following way (see, e.g., JP-A-11-283035).

$$C = \sum_{y=1}^{n-1}\sum_{x=1}^{m-1}\{g(x+1, y) - g(x, y)\}^2 + \quad \text{[Expression 1]}$$

$$\sum_{y=1}^{n-1}\sum_{x=1}^{m-1}\{g(x, y+1) - g(x, y)\}^2$$

In the expression, g(x, y) represents the luminance of a pixel located at (x, y) on a plane of XY-coordinates. The contrast is calculated for m×n pixels in the tool T.

In this case, if the region D is located upper (in the Y-axis direction) than the central position of the tool T as illustrated in FIG. 7B, maximum contrast is obtained when the position Zd corresponding to a timing, at which the camera 141 images the region D before reaching the position Z2, is an in-focus position. On the other hand, if the region D is located lower (in the Y-axis direction) than the central position of the tool T as illustrated in FIG. 7C, maximum contrast is obtained when the position Zd corresponding to a timing, at which the camera 141 images the region D after reaching the position Z2, is an in-focus position. Accordingly, in any of these cases, maximum contrast cannot be obtained even if the position Z2 corresponding to a timing, at which the center of the image is imaged, is an in-focus position. Thus, when the region D most contributing to contrast is deviated from the center of the image, the contrast curve itself illustrated in FIG. 4 is laterally shifted. Accordingly, an accurate in-focus position cannot be obtained.

Thus, according to this embodiment, a contrast value $C_+$ is obtained every line, considering the timing of imaging thereof. Then, the arithmetic mean of the obtained contrast values $C_+$ is calculated to thereby obtain the contrast value C of a frame.

Figure 8:
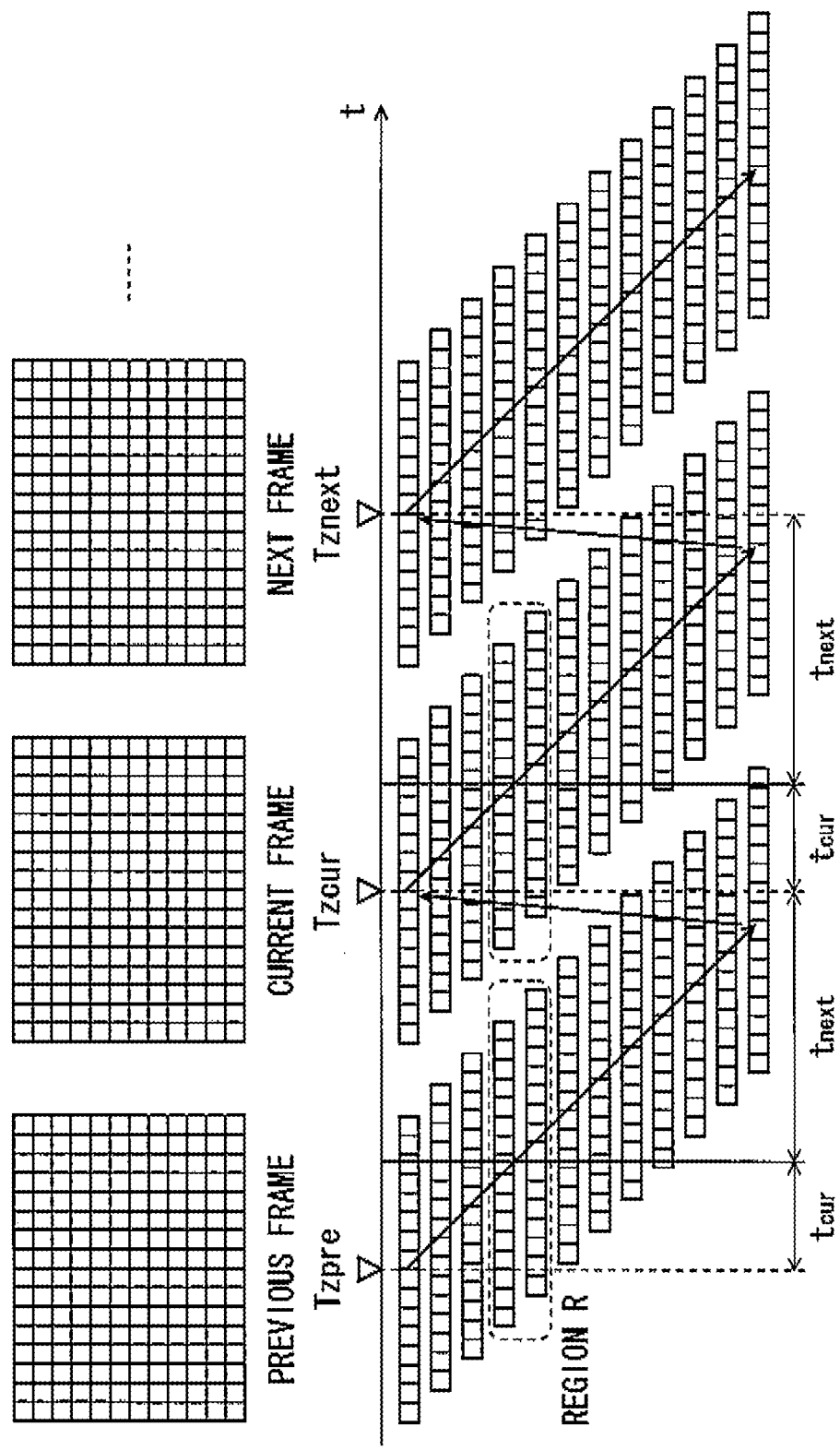
FIG. 8 is a diagram for describing a contrast correction method performed in the imaging apparatus according to the first embodiment of the invention.

FIG. 8 is a diagram for describing this contrast value calculation processing. In FIG. 8, each of timings $T_{zpre}$, $T_{zcur}$, and $T_{znext}$ indicated with symbols ∇ represents a reference position of each frame. In this example, each reference position corresponds to a timing of imaging a leading line. The timing of imaging each pixel of each line differs from that of imaging each of the other pixels thereof. However, for facilitating processing, the timing of imaging each line is set at that of imaging a pixel located at the central position of each line. The timing of imaging each line is behind that $T_{zcur}$ of imaging the reference position of a current frame by a time $t_{cur}$, and advanced from the timing $T_{znext}$ of imaging the reference position of the next frame by a time $t_{next}$. Accordingly, if the contrast of each line of a current frame and that of each line of the next frame are set at $\Delta C_{cur}$ and $\Delta C_{next}$, respectively, the contrast value $C_+$ of each line of the current frame, which is corrected by a proportional distribution in consideration of the timing of imaging such lines, can be calculated by the following expression.

$$C_+ = \Delta C_{cur} \cdot k + \Delta C_{prev} \cdot (1-k) \quad \text{[Expression 2]}$$

In this expression, $k = t_{next}/(t_{cur}+t_{next})$. The value of k can be approximately calculated using Y-coordinate values. Thus, the contrast value can be corrected, based on which of the timing of imaging the previous frame and that of imaging the current frame is closer to the timing of imaging the reference position of the current frame, by obtaining the contrast value $C_+$ of each line of the current frame. Then, the contrast value C of each frame can be calculated from the obtained contrast value $C_+$ of each line as follows.

$$C = \frac{1}{n}\sum_{y=1}^{n-1} C_+ \quad \text{[Expression 3]}$$

According to the above embodiment, the contrast value $C_+$ of each line is obtained. However, the image measuring apparatus can be configured such that the contrast value $C_+$ of each pixel is obtained. Besides, when the contrast value $C_+$ of each pixel is obtained, the value of k can be calculated using X-coordinate values and Y-coordinate values. Alternatively, the image measuring apparatus can be configured such that the contrast value $C_+$ of each set of several lines, which is configured like each region R illustrated in FIG. 8, is obtained. If the contrast value $C_+$ of each pixel is obtained, accuracy is improved. If the contrast value $C_+$ of each broader region R is obtained, the burden of computation can be alleviated. In addition, the reference position can be set at an intermediate position or the end of a frame, instead of the beginning thereof.

According to such a method, even when a relatively inexpensive CMOS camera of the rolling shutter type is used as the camera 141, autofocusing can be performed with good accuracy.

What is claimed is:

1. An image measuring apparatus comprising:

an imaging device comprising a rolling shutter configured to provide a prior image of a work, a current image of the work, and a subsequent image of the work;

a position control system configured to output a focusing position as information representing a position in a direction of a focusing axis by controlling an in-focus position of the imaging device; and a computing device configured to calculate, from image information acquired from the imaging device, contrast information corresponding to the image information, wherein the rolling shutter exposes a plurality of regions of light receiving elements of the imaging device separately in different timing of imaging from each other such that a plurality of regions of the respective prior, current, and subsequent images differ from one another in timing of imaging in each of the prior, current, and subsequent images, the computing device corrects the contrast information corresponding to the image information based on a position of and the contrast information corresponding to each of the regions of the respective prior, current, and subsequent images, and the computing device corrects contrast information of each region of the current image based on contrast information of corresponding each region of the prior image and contrast information of corresponding each region of the subsequent image and based on closeness of timing of imaging the each region of the current image to timing of imaging the corresponding each region of the prior image and timing of imaging the corresponding each region of the subsequent image.

2. The image measuring apparatus according to claim 1, wherein the computing device calculates contrast information concerning each of regions respectively corresponding to the prior image information and the subsequent image information, multiplies the contrast information by a weight corresponding to imaging timing thereof, and sums results of the multiplication.

* * * * *